US006941018B2

(12) United States Patent
Onishi et al.

(10) Patent No.: US 6,941,018 B2
(45) Date of Patent: Sep. 6, 2005

(54) METHOD OF AND APPARATUS FOR SEARCHING CORRESPONDING POINTS BETWEEN IMAGES, AND COMPUTER PROGRAM

(75) Inventors: Hiroyuki Onishi, Hyogo (JP); Takeo Kanade, Pittsburgh, PA (US)

(73) Assignee: Glory Ltd., Hyogo (JP)

( * ) Notice: Subject to any disclaimer, the term of this patent is extended or adjusted under 35 U.S.C. 154(b) by 713 days.

(21) Appl. No.: 09/815,267

(22) Filed: Mar. 23, 2001

(65) Prior Publication Data

US 2002/0136457 A1 Sep. 26, 2002

(51) Int. Cl.⁷ .............................................. G06K 9/68
(52) U.S. Cl. ..................................... 382/218; 382/278
(58) Field of Search ........................ 382/209, 215–222, 382/278

(56) References Cited

U.S. PATENT DOCUMENTS

| | | | |
|---|---|---|---|
| 5,146,228 A | * | 9/1992 | Irani et al. ..................... 342/64 |
| 5,742,710 A | | 4/1998 | Hsu et al. |
| 5,768,404 A | | 6/1998 | Morimura et al. |
| 6,445,832 B1 | * | 9/2002 | Lee et al. .................... 382/266 |
| 6,721,462 B2 | * | 4/2004 | Okabayashi et al. ........ 382/278 |

FOREIGN PATENT DOCUMENTS

EP    0 503 250 A2    9/1992
EP    0 932 115 A2    7/1999

OTHER PUBLICATIONS

T. Poggio et al., "Computational Vision and Regularization Theory", NATURE vol. 317, Sep. 1985, pp. 314–319.
S. Uchida et al., "Monotonic and Continuous Two–Dimensional Warping Based on Dynamic Programming", Trans. of the Institute of Electronics, Info. & Comm. Eng. D–II, vol. J81–D–88:6, 1251–1258, Jun. 1988.
V.K. Govidan et al., "Character Recognition—A Review", Pattern Recognition, vol. 23, No. 7, 1990, pp. 671–683.

* cited by examiner

Primary Examiner—Jon Chang
Assistant Examiner—Charles Kim
(74) Attorney, Agent, or Firm—Foley & Lardner LLP

(57) ABSTRACT

In the apparatus for searching corresponding points between an input image and a reference image, a reference image and an input image are received through an image input section. The division process section produces a reference partial image and an input partial image. The similarity degree image production section respectively produces similarity degree images whose similarity degree between the reference partial image and the input partial image. The accumulation-addition processing section recursively performs an accumulation-addition of a plurality of similarity degrees. Based on the result, the corresponding points determination section determines the corresponding points between the input image and the reference image.

24 Claims, 18 Drawing Sheets

REFERENCE IMAGE 21

32 × 32

INPUT IMAGE 22

32 × 32

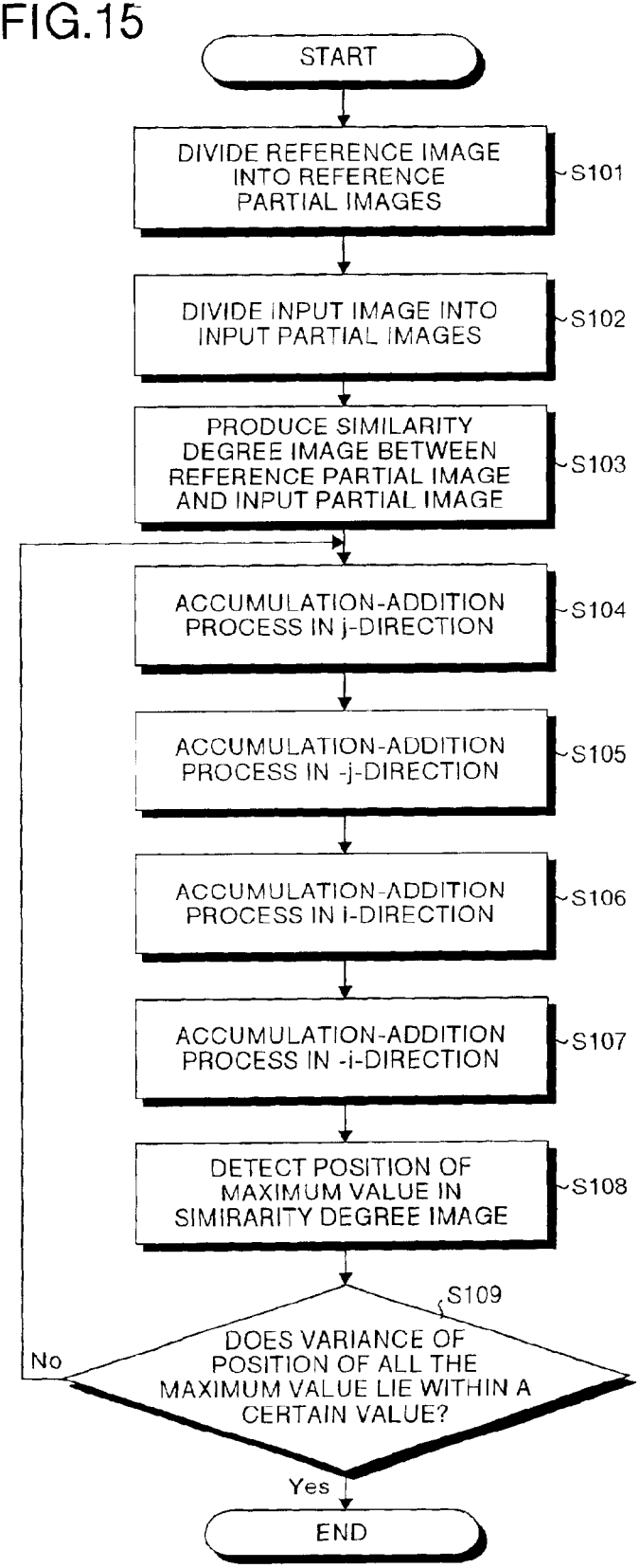

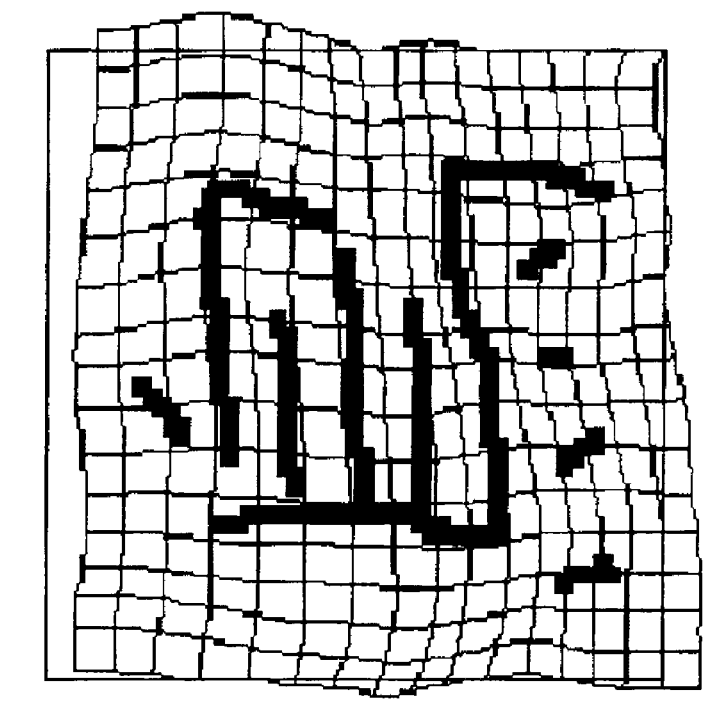
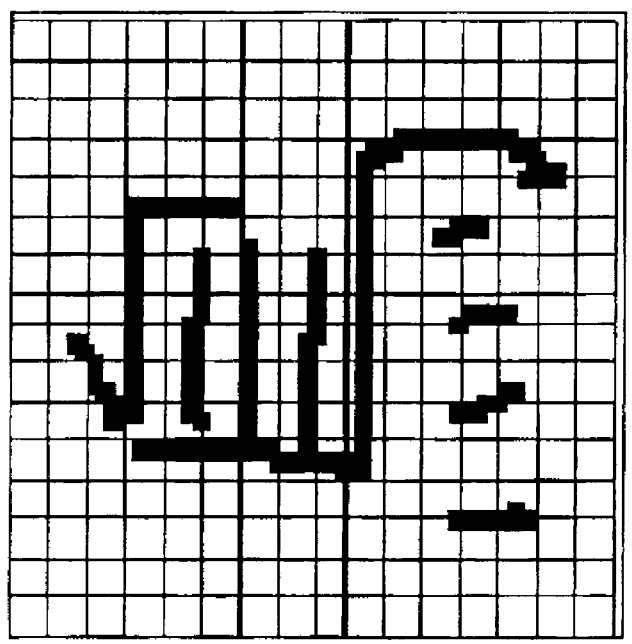
FIG.20

US 6,941,018 B2

METHOD OF AND APPARATUS FOR SEARCHING CORRESPONDING POINTS BETWEEN IMAGES, AND COMPUTER PROGRAM

FIELD OF THE INVENTION

The present invention relates to a technology of searching corresponding points for establishing correspondence between an input image and a reference image which is an object for comparison with the input image. More particularly, this invention relates to a technology capable of rapidly obtaining a stable result without resulting in obtaining a local solution (local minimum) when establishing a correspondence between the input image and the reference image.

BACKGROUND OF THE INVENTION

Conventionally, there is known a method of establishing correspondence between images by searching corresponding points between an input image and a reference image when verifying the input image with a reference image registered beforehand. The input image may be input through an image input apparatus such as a scanner.

For example, in "Computational vision and regularization theory" by T. Poggio, V. Torre and C. Koch, in NATURE Vol. 317, pp. 314–319, 1985 ("conventional art 1"), discloses a technique using the standard regularization theory for minimizing a set energy function in a calculus of variations. In the standard regularization theory adopted in the conventional art 1, corresponding points between images are calculated at minimizing energy by employing a repetition calculation merely using a local information. As a result, parallel distributed process can be performed, and in addition, information processing such as that performed in a human brain may be realized.

"Monotonic and continuous two-dimensional warping method based on a Dynamic Programming " by Seiichi UCHIDA and Hiroaki SAKOE, in THE TRANSACTIONS OF THE INSTITUTE OF ELECTRONICS, INFORMATION AND COMMUNICATION ENGINEERS D-II, Vol. J81-D-II no. 6, pp. 1251–1258, June 1998 ("conventional art 2"), discloses a technique of a two-dimensional DP-warping method for efficiently searching an optimum solution with DP. According to the conventional art 2, the optimization problem can be solved efficiently.

However, the conventional art 1 has a problem. Because the corresponding points are calculated by minimizing energy with repetition calculation merely using a local information, the solution greatly depends on the initial value. In addition, because it is easy to converge to a local solution, it is difficult to obtain an optimum correspondence.

Further, the conventional art 2 also has a problem. Although an optimum solution can be efficiently searched with DP, amount of calculation becomes vast. Concretely, calculation time having exponent-order for an image size is required in order to obtain the optimum solution.

In view thereof, an important problem occurs how an apparatus is realized which searches corresponding points of images and which can rapidly obtain a result of a stable correspondence without resulting in any local solution when making an image correspond to the other image, i.e. applying correspondence relationship to between images.

SUMMARY OF THE INVENTION

It is an object of this invention to provide a method and an apparatus capable of rapidly obtaining a stable result without resulting in obtaining a local solution (local minimum) when establishing a correspondence between the input image and the reference image. It is another object of this invention to provide a computer program containing instructions which when executed on a computer realizes the method according to the present invention.

According to the present invention, a plurality of similarity degree images each having a similarity degree between the input image and the reference image as a pixel value are produced. Then, corresponding points between the input image and the reference image are detected based on the detected plurality of similarity degree images.

Other objects and features of this invention will become apparent from the following description with reference to the accompanying drawings.

BRIEF DESCRIPTION OF THE DRAWINGS

FIG. 15 is a flow chart of a process performed by the corresponding point searching apparatus shown in FIG. 1.

FIG. 20 shows an example in which the present invention is applied to a recognition of a Chinese character.

DESCRIPTION OF THE PREFERRED EMBODIMENTS

Preferred embodiment of a method of and an apparatus for searching corresponding points between images to search corresponding points for making an input image correspondent to a reference image of object of comparison with the input image, and a computer program for realizing the method according to the present invention on a computer will be explained below with reference to the accompanying drawings.

Figure 1:
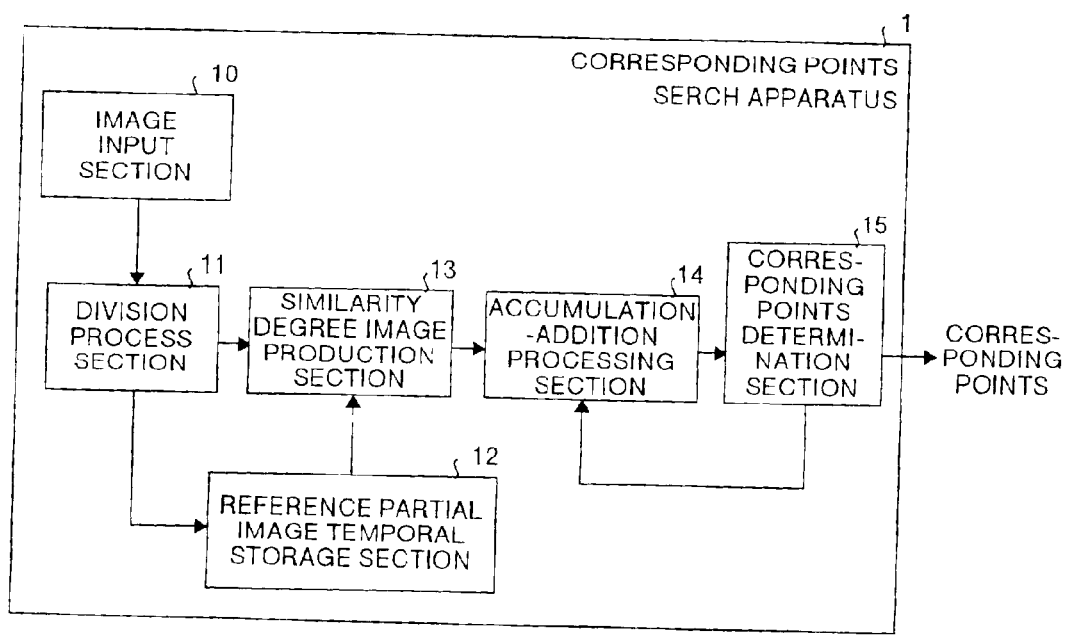
FIG. 1 shows a functional block diagram showing a construction of a corresponding point searching apparatus relating to the embodiment of the present invention.

A functional block diagram of the apparatus for searching corresponding points according to the present embodiment is shown in FIG. 1. This apparatus 1 mainly comprises (1) a similarity degree image production section, and (2) a corresponding points determination section. The similarity degree image production section produces a similarity degree image for indicating a similarity degree between an input partial image obtained by dividing the input image and the reference partial image obtained by dividing the reference image. The corresponding points determination section determines optimum corresponding points based on the result obtained by accumulatively adding a plurality of similarity degree images.

Concretely, in the similarity degree image production section, e.g. a correlation value is sequentially obtained, moving a reference partial image formed by 7×7 pixel size in an input partial image formed by 21×21 pixel size and a similarity degree image having this correlation value as a pixel value is produced. As a result, this similarity degree image will indicate to what extend a central point on the reference partial image is similar to a point on an input partial image.

In the corresponding points determination section, each of similarity degree images is renewed, recursively repeating accumulation-addition for a pixel value of each of the similarity degree images in a vertical direction and in a horizontal direction to produce a similarity degree image and obtains a position of pixel having a maximum image value of images forming each similarity degree image is obtained, so that this position is determined as a corresponding point on the input partial image.

Thus, according to the apparatus 1 for searching corresponding points, it becomes harder to result in obtaining a local minimum because a wider optimization can be performed as compared to the conventional technique. Correspondence between images becomes highly accurate because an optimizing minute adjustment repeating accumulation-addition is employed. And a hardware becomes easy to fabricate because a parallel distributed process becomes possible.

Construction of the apparatus 1 for searching corresponding points shown in FIG. 1 will be explained in more detail. It will be considered here that images are input in the order of reference image and input image. As shown in FIG. 1, the apparatus 1 comprises image input section 10, division process section 11, reference partial image temporal storage section 12, similarity degree image production section 13, accumulation-addition processing section 14, and corresponding points determination section 15.

The image input section 10 receives a reference image Io(i, j) and an input image $I_1$ (i, j). Here, $0 \leq i \leq I-1$ and $0 \leq j \leq J-1$), and I is a number of pixels in vertical direction and J is a number of pixels in horizontal direction. Concretely, the image input section 10 may be an image scanner which optically read an object to obtain an image. On the other hand, image input section 10 may be an interface section for obtaining an image from a network, or it may be a reading section for reading an image from a memory and so on. The input image is defined as an image of object to be searched for corresponding points and it may accompany with distortion and deformation. On the contrary thereto, the reference image is defined as an image to be compared with the input image and preferably, it may not have distortion or the like.

Figure 2A:
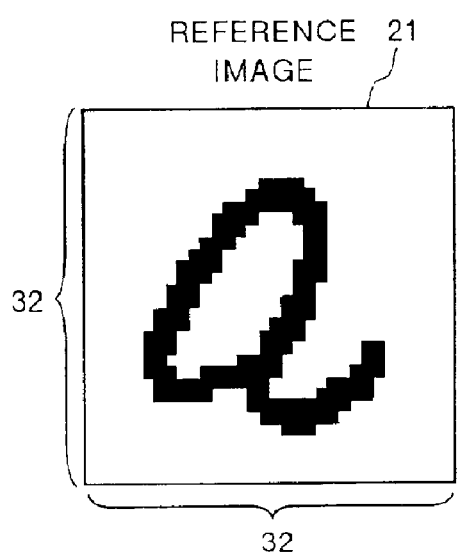
FIG. 2A is an example of a reference image and FIG. 2B is an example of an input image used in the embodiment of the present invention.
Figure 2B:
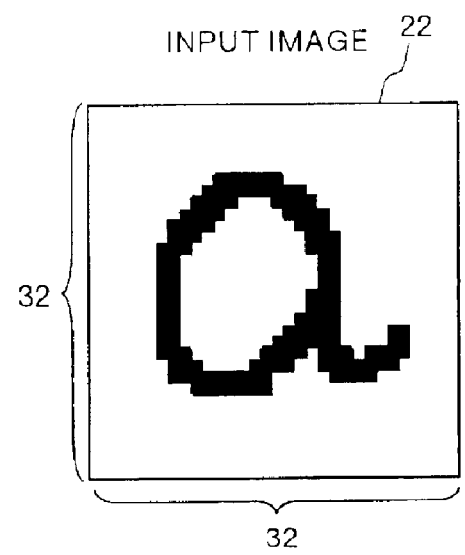

FIG. 2A shows the reference image 21. FIG. 2B shows the input image 22. Both, the reference image 21 and the input image 22, are images of English alphabet "a". Both the images are of size 32×32 pixels.

The division process section 11 is for dividing an input image and a reference image input from the input image portion 10 into an input partial image and a reference partial image, respectively. Here, the procedure of division of the input image and that of the reference image are mutually different.

When dividing the reference image, a reference partial image is produced, whose center lies at a center of sampling point $(p_m, q_n)$ (where $0 \leq m \leq M-1$, $0 \leq n \leq N-1$) obtained by sampling M numbers of points in a vertical direction and N numbers of points in a horizontal direction on the reference image.

Figure 3:
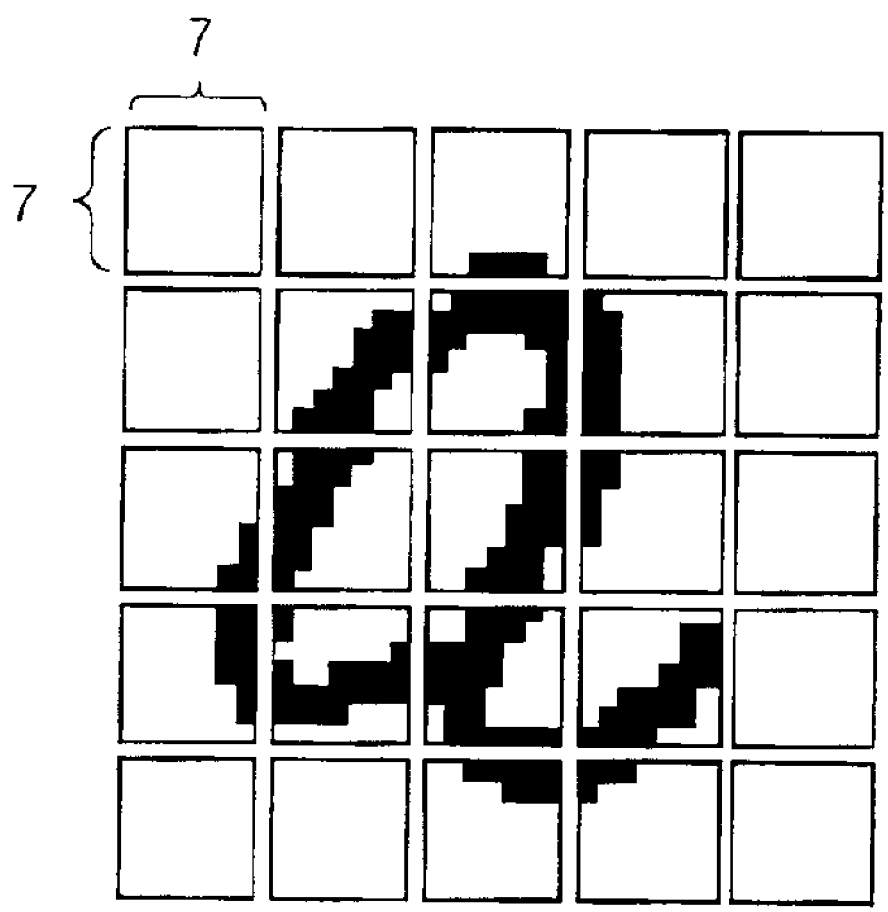
FIG. 3 shows an example of a reference partial image (i.e. a portion of the reference image).

FIG. 3 shows an example of result of division of the reference image 21 shown in FIG. 2A. As shown in FIG. 3, the reference image 21 formed by 32×32 pixels is divided into twenty five reference partial images formed by 7×7 pixels. Concretely, the relationship of $P_m$=round (I/M) and $q_n$=round (J/N) is satisfied. The term of "round ( )" is meant by "round to the nearest whole number". When dividing an input image, being different from dividing the reference image, the input image is divided so as to have overlapped data in which parts of each of the input partial images are mutually overlapped.

Figure 4:
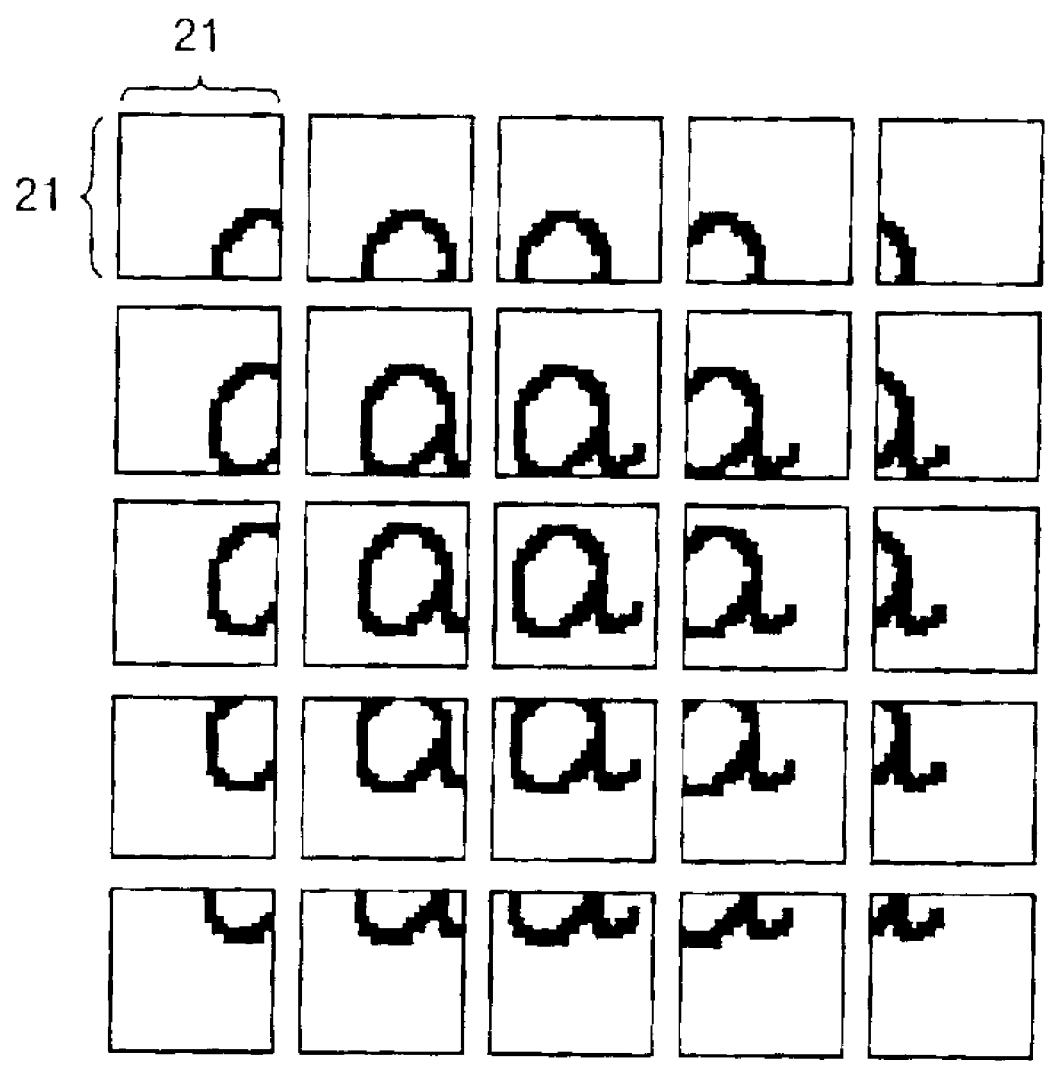
FIG. 4 shows examples of input partial images (i.e. portions of the input image).

FIG. 4 is for showing an example of result of division of the input image 22 shown in FIG. 2B. As shown in FIG. 4, the reference image 22 formed by 32×32 pixels is divided into twenty five reference partial images formed by 21×21 pixels.

The reference partial image temporal storage section 12 is for temporally storing each of the reference partial images divided by the division process section 11 in which a corresponding reference partial image is picked up when the similarity degree image production section 13 produces a similarity degree image.

The similarity degree image production section 13 is for calculating a similarity degree, considering over deformation between the input partial image and the reference partial image to produce a similarity degree image Cmn(u,v) (where $0 \leq m \leq M-1$, $0 \leq n \leq N-1$ and $0 \leq v \leq V-1$) having the similarity degree as a pixel value. Here, U and V respectively corresponds a vertical size and a horizontal size. A normalized correlation coefficient ($\sigma_{fg}/(\sigma_f \sigma_g)$) can be used as this similarity degree.

Figure 5:
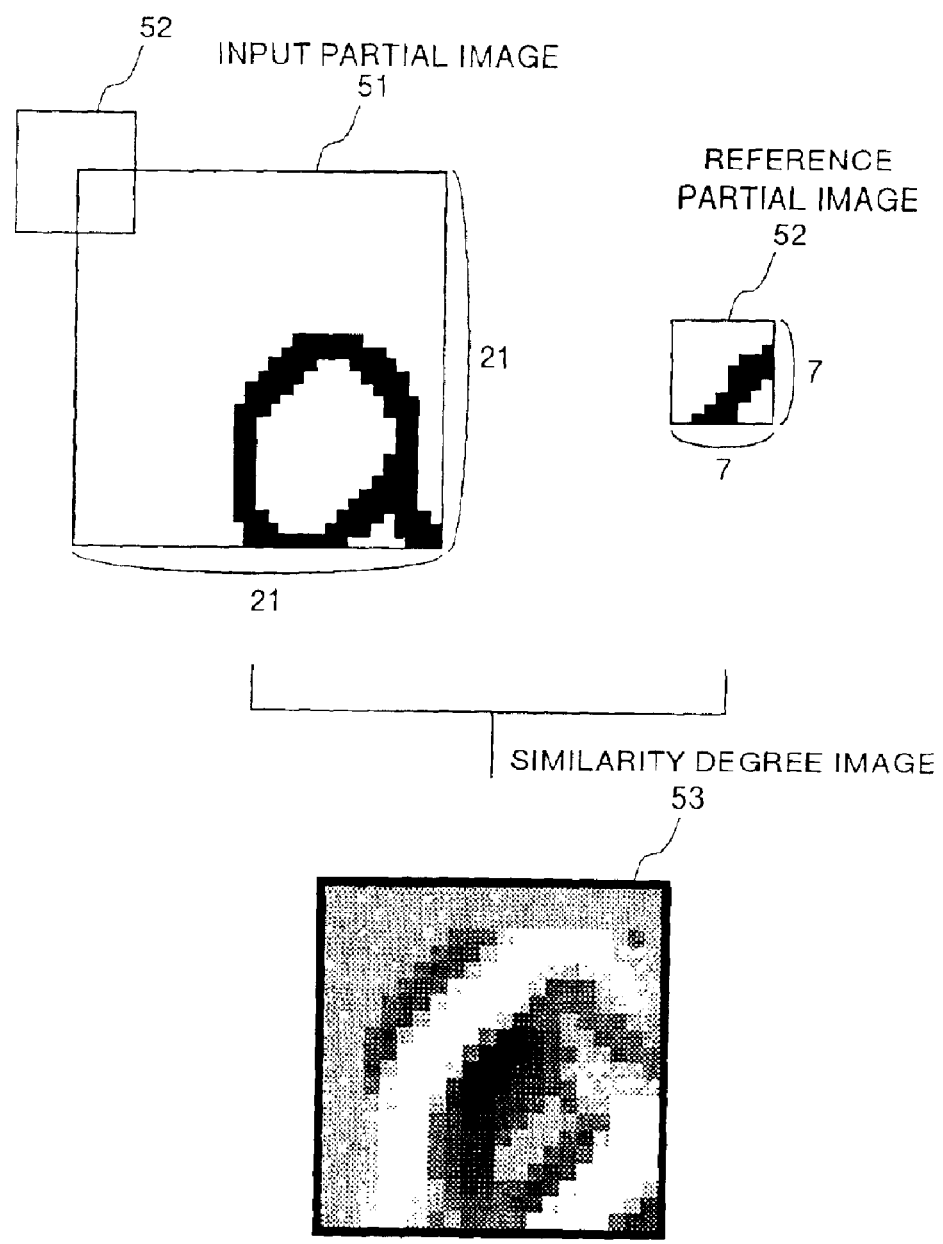
FIG. 5 explains how a similarity degree image is prepared.

FIG. 5 is for explaining about conception for producing a similarity degree image from the reference partial image and the input partial image. Here, the input partial image and the reference partial image can be used which are positioned at a position of two-rows and two-columns in FIG. 3 and FIG. 4.

When obtaining a similarity degree between the input partial image 51 and the reference partial image 52 shown therein is obtained, a normalized correlation coefficient is calculated, making a center pixel of the reference partial image 52 correspond to a pixel at an upper-left portion of the input partial image 51. The calculation result is defined as a pixel value of the pixel at the upper-left portion of the similarity degree image 53. Thereafter, the reference partial image 52 is displaced rightward and the process is performed in a same way. The above-mentioned process is performed for all the pixels of the input partial image 51, displacing the reference partial image 52, resulting in obtaining the similarity degree image 53.

Figure 6:
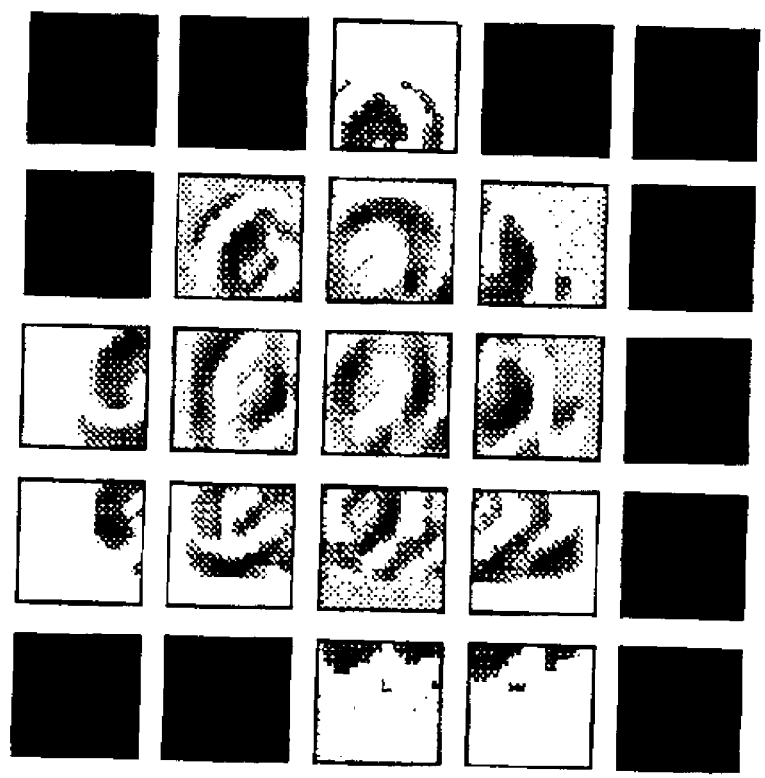
FIG. 6 shows a similarity degree image corresponding to each of the input partial image shown in FIG. 4.

If such a process for producing a similarity degree image is performed for each of input partial images, then a plurality of similarity degree images can be obtained as shown in FIG. 6. Here, if each of pixel values of all the pixels in the reference partial images is constant, then the denominator of a normalized correlation coefficient becomes zero. As a result, the pixel value of the similarity degree image in this case also becomes zero.

The accumulation-addition processing section 14 is for recursively accumulation-adding each of similarity images in order from in the j-direction, the –j-direction, the i-direction and the -i-direction. Concretely, when accumulation-adding in the j-direction for similarity degree images of n=1 to (N−1);

$$Cmn(u,v)=Cmn(u,v)+\alpha MAX(Cmn_{-1}(p,g))$$

which is sequentially and recursively calculated. Here, the term of "Max( )" is defined as a maximum value and α is a constant value (where 0≦u≦U−1, 0≦v≦V−1, 0≦m≦M−1, 0≦n≦N−1, u−1≦p≦u+1 and v−1≦q≦v+1).

Figure 8:
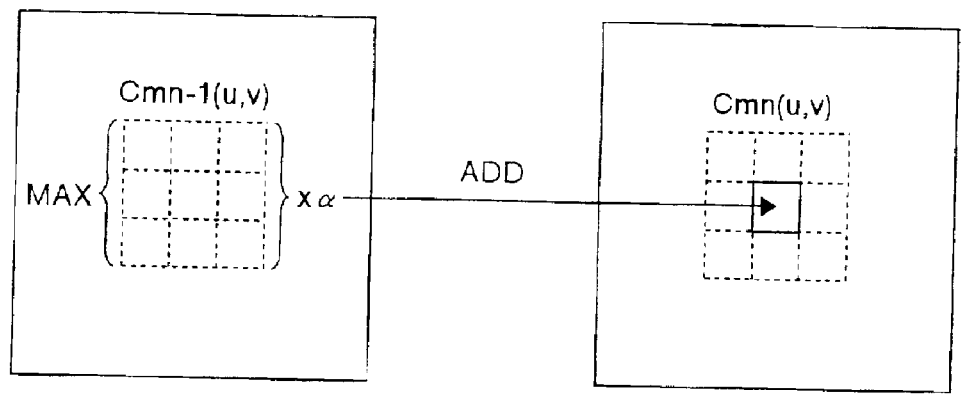
FIG. 8 explains the accumulation-addition process in a j-direction.

Namely, when performing accumulation-addition in the j-direction, a maximum value is obtained in 3×3 pixels whose center is C mn−1(p,q) as shown in FIG. 8. Thereafter, this maximum pixel value is multiples by α. The multiply value is added to the pixel value of Cmn(p,q). Such a process is recursively repeated.

Figure 9:
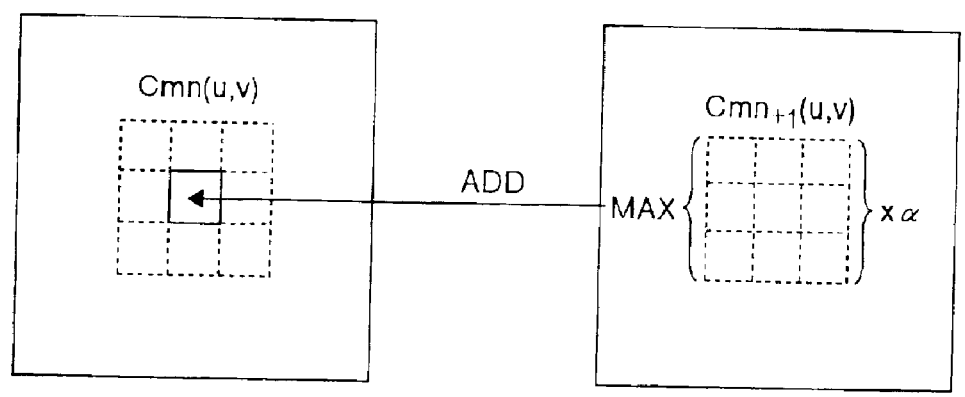
FIG. 9 explains the accumulation-addition process in the -j-direction (opposite of the j-direction).

Further, for a similarity degree image of n=(N−2) to 0 when performing accumulatively addition in −j-direction, following equation is sequentially and recursively calculated.

$$Cmn(u,v)=Cmn(u,v)+\alpha Max(Cmn_{+1}(p,q))$$

where 0≦u≦U−1, 0≦v≦V−1, 0≦m≦M−1 and 0≦n≦N−2. Namely, when performing accumulation-addition in the −j-direction, as shown in FIG. 9, a maximum pixel value in 3×3 pixels whose center lies at $Cmn_{30\ 1}(p, q)$ is obtained. This maximum pixel value is multiplied by α. Then a process is recursively repeated for adding the multiply value to the pixel value of Cmn(p,q).

Figure 10:
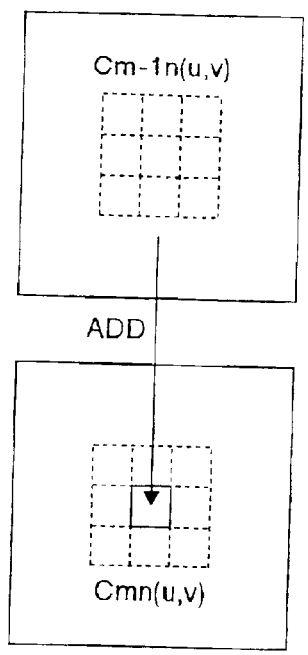
FIG. 10 explains the accumulation-addition process in a i-direction.

Furthermore, for similarity degree images of m=1 to (M−1) when performing accumulation-addition in the i-direction, following equation is sequentially and recursively calculated;

$$Cmn(u,v)=Cmn(u,v)+\alpha Max(Cm_{-1}n(p,q))$$

where 0≦u≦U−1, 0≦v≦V−1, 1≦ ≦M−1, and 0≦n≦N−1. Namely, when performing accumulation-addition in the i-direction, as shown in FIG. 10, a maximum pixel value in 3×3 pixels whose center lies at $Cm_{-1}n$ (p, q) is obtained. This maximum pixel value is multiplied by α. Then a process is recursively repeated for adding the multiply value to the pixel value of Cmn(p,q).

Figure 11:
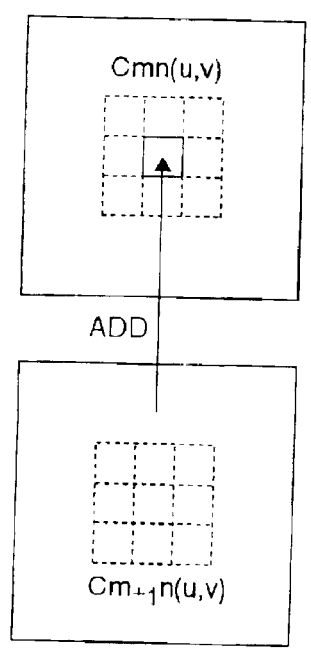
FIG. 11 explains the accumulation-addition process in the -i-direction (opposite of the i-direction).

Furthermore, for a similarity degree image of m=(M−2) to 0 when performing accumulation-addition in the -i-direction, following equation is sequentially and recursively calculated.

$$Cmn(u,v)=Cmn(u,v)+\alpha Max(Cm_{+1}n\ (p,q))$$

where 0≧u≦U−1, 0≦v≦V−1, 0≦m≦M−2, and 0≦n≦N−1. Namely, when performing accumulation-addition in -i-direction, as shown in FIG. 11, a maximum pixel value in 3×3 pixels whose center lies at $Cm_{+1}n$ (p, q) is obtained. This maximum pixel value is multiplied by α. Then a process is recursively repeated for adding the multiply value to the pixel value of Cmn(p,q).

The corresponding points determination section 15 is for determining corresponding points based on a similarity degree image after accumulation-addition in cooperation with the accumulation-addition processing section 14. Concretely, a position of a maximum value in each of similarity images is performed when the accumulation-addition is completed in each of the directions. Thereafter, if variance between the position thereof and the position of the maximum value at the time of the previous accumulation addition does not lie within a predetermined area, then the accumulation addition process is feedbacked and repeated. The repetition process is completed at the time when it lies within the predetermined area. Then the position of the maximum value of each of similarity degree images is decided as a corresponding point.

Figure 12:
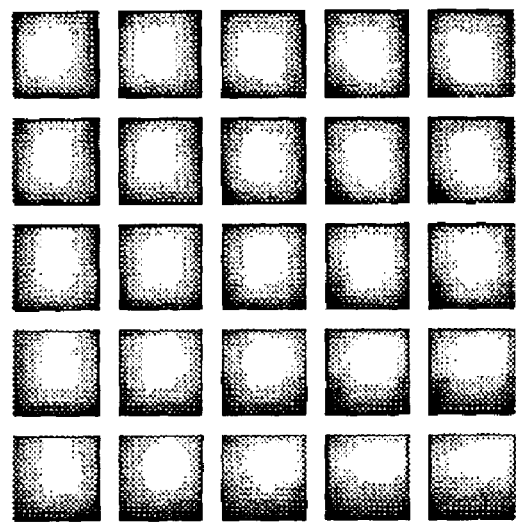
FIG. 12 shows similarity degree images after accumulative calculation.
Figure 13:
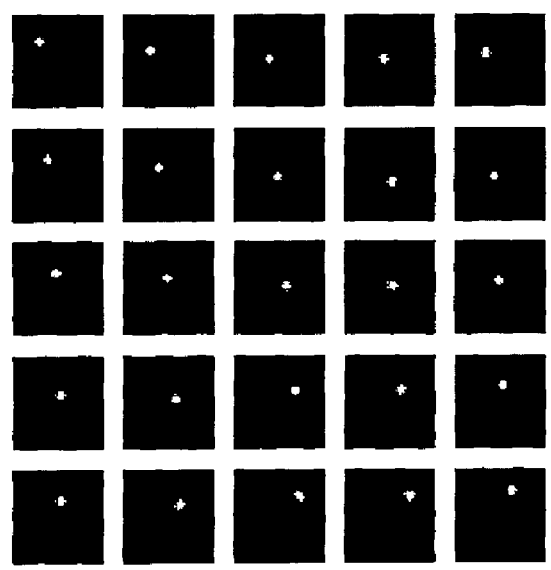
FIG. 13 shows positions of maximum value in the similarity degree images shown in FIG. 12.
Figure 14A:
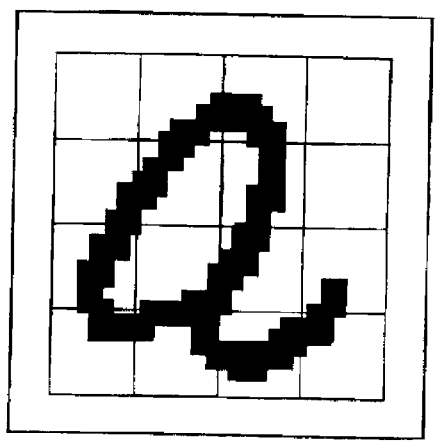
FIG. 14A and FIG. 14B show examples of distortion (deformation) of the reconstructed input image based on the corresponding points.
Figure 14B:
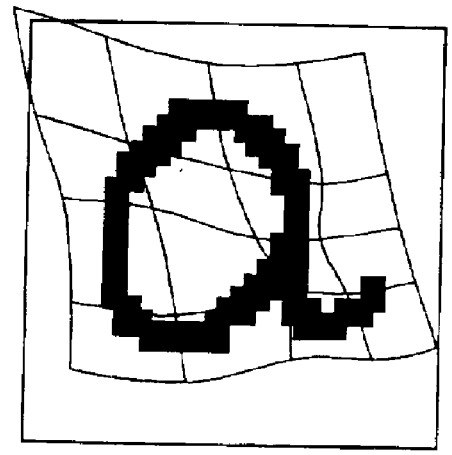

For example, when obtaining each of the similarity degree images as shown in FIG. 12 by repetition of accumulation addition process, an amount of variance of position of the maximum value of each of the similarity degree images is examined. When the amount thereof lies to exist within a predetermined area, then a position of the maximum value of each of the similarity degree images is obtained as shown in FIG. 13. This obtained points are defined as a corresponding points. Here, distortion of the input image based on the corresponding points will be shown in FIG. 14.

Next, a process performed by the apparatus 1 for searching corresponding points shown in FIG. 1 will be explained with reference to FIG. 2 through FIG. 14.

FIG. 15 shows a flow chart for indicating a process procedure of the apparatus 1 for searching corresponding points shown in FIG. 1. As shown in FIG. 15, if the apparatus 1 for searching corresponding points obtains a reference image and an input image, then the reference image is divided into reference partial images (Step 101). For example, the reference image 21 formed by 32×32 pixels shown in FIG. 2A is divided into twenty five reference partial images formed by 7×7 pixels shown in FIG. 3 and the divided ones are stored. This reference partial images may be pre-stored by each of images to be referred. Not a reference partial image but an only reference image is pre-stored independently, the stored reference image may be divided into reference partial images at the time of below-mentioned calculation of similarity between an input image and a reference image.

Thereafter the input image is divided into input partial images (Step 102). For example, the input image 22 formed by 32×32 pixels shown in FIG. 2B is divided into twenty five input partial images formed by 21×21 pixels shown in FIG. 4.

Then, a similarity degree image is produced between the reference partial images and the input partial images (Step 103). For example, as shown in FIG. 5, the similarity degree image 53 is produced in which similarity degrees of the input partial image 51 and the reference partial image 52 are defined as a pixel value produced by each of the input partial images, so that a plurality of similarity degree images as shown in FIG. 6 are produced.

Next, the j-direction accumulation addition process (Step 104), the –j-direction accumulation addition process (Step 105), the i-direction accumulation addition process (Step 106), and the -i-direction accumulation addition process (Step 107) are performed in which a position of a maximum value of the similarity degree image is detected (Step 108).

Figure 7:
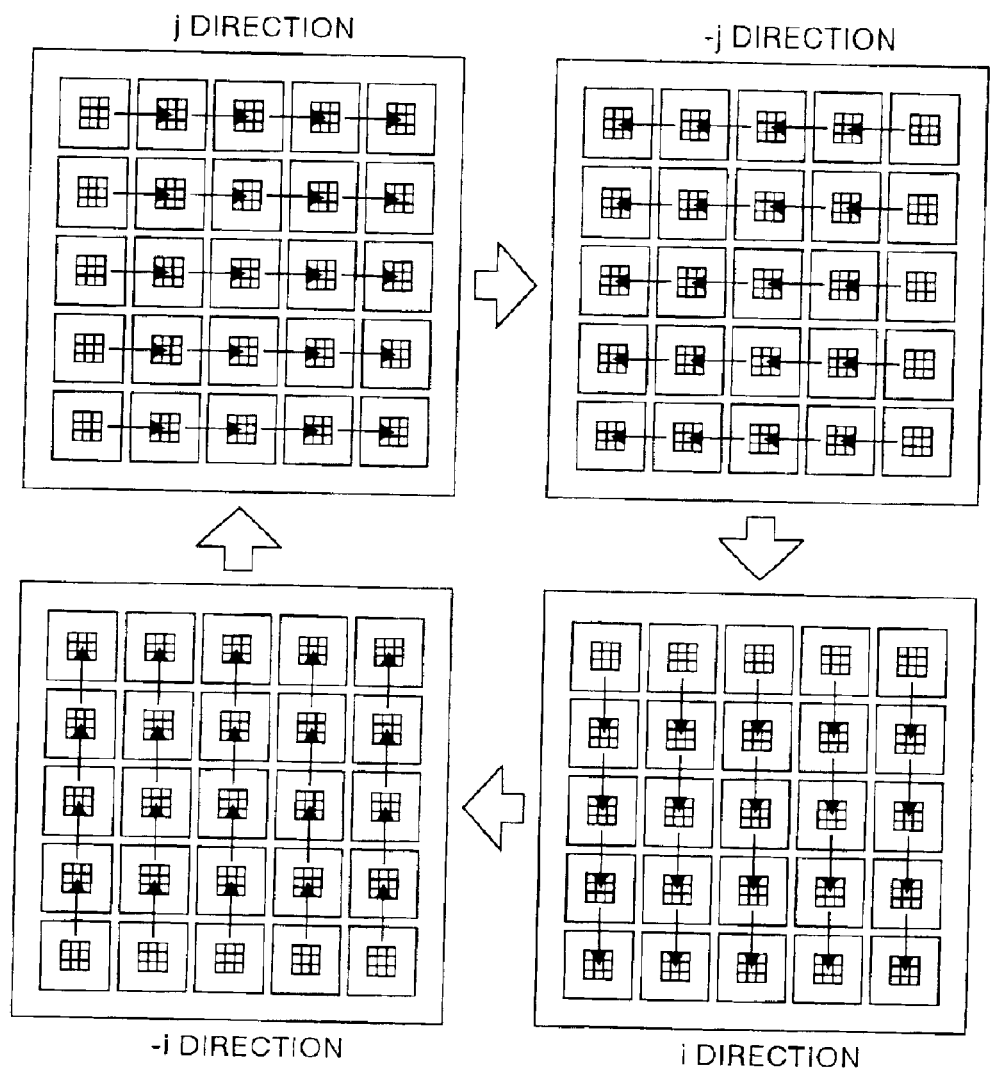
FIG. 7 explains an accumulation-addition procedure.

Concretely, addition processes shown in FIGS. 8 to 11 are recursively repeated as shown in FIG. 7, the similarity degree image as shown in FIG. 12 is produced and a position of the maximum value of each of the similarity degree images is detected as shown in FIG. 13.

Next, it is examined whether or not variance of position of the maximum value lies within a constant value (Step 109). If not so (No at Step 109), then the procedure is advanced to Step 104 in which a same way is repeated. On the other hand, if so (Yes at Step 109), the procedure is completed, defining this position as a corresponding point.

Figure 16:
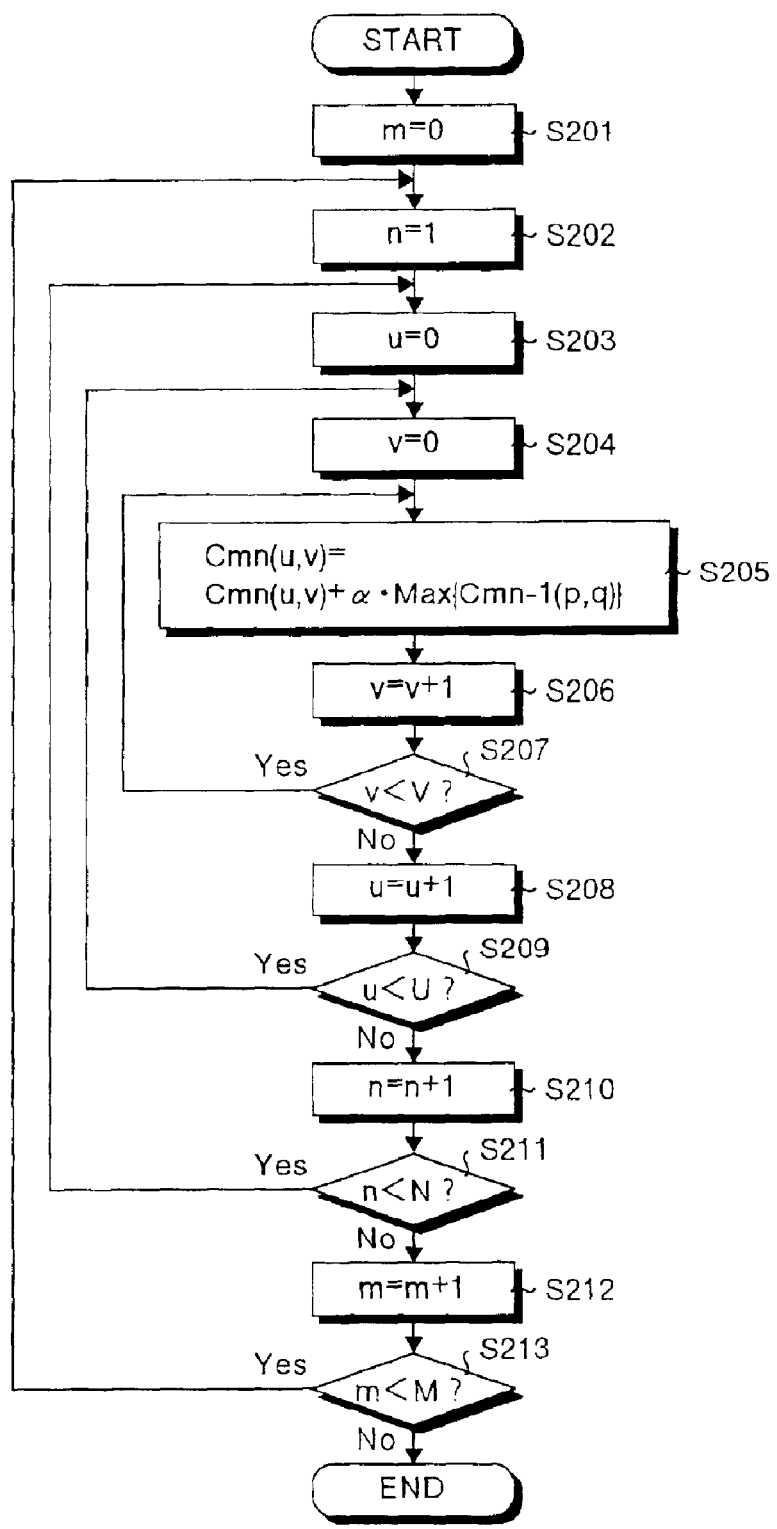
FIG. 16 is a flow chart of an example of the accumulation-addition process.

Next, an explanation will be given about the j-direction accumulation-addition process procedure using the accumulation-addition processing section 14 shown in FIG.1. FIG. 16 shows a flow chart for indicating the j-direction accumulation addition process procedure using the accumulation-addition processing section 14 shown in FIG. 1. Here, such an accumulation addition process can also be applied to the –j-direction, the i-direction, and the -i-direction ones.

As shown in FIG. 16, at first, variables m, u and v are set as zero and initialization is performed for setting the variable n as one (Steps 201 to 204). Here, the variable m is used as an index in the i-direction. The variable n is used as an index in the j-direction index and the variables, variables u and v are relatively ones in the i-direction and the j-direction for indicating a searching area.

If this initialization is completed, then following calculation is performed (Step 205).

$$Cmn(u,v)=Cmn(u,v)+\alpha\text{Max}(Cmn_{-1}(p,q))$$

Thereafter, the variable v is incremented (Step 206). If this variable v is smaller than V (Yes at Step 207), then the procedure is advanced to Step 205 in which the addition process is repeated. Namely, an area to be searched is displaced in the j-direction.

On the contrary thereto, if the variable v is more than V (No at Step 207), then the variable u is incremented (Step 208). If the variable u is smaller than U (Yes at Step 209), then the procedure is advanced to Step 204 in which addition process is repeated. Namely, an area to be searched is displaced in the i-direction.

If the variable u is more than U (No at Step 209), then calculation for a pixel is completed and the procedure is advanced to a next pixel. Concretely, the variable n is incremented and a target pixel is advanced in the j-direction (Step 210). Thereafter this variable n is compared with N (Step 211). If the variable n is smaller than N (Yes at Step 211), then the procedure is advanced to Step 203 and the addition process is repeated.

On the contrary thereto, if the variable n is more than N (No at Step 211), then the variable m is incremented and a target pixel is advanced in the i-direction(Step 212). If this variable m is smaller than M (Yes at Step 213), then the procedure is advanced to Step 202 and the addition process is repeated. If the variable m is more than M (No at Step 213), then the process is completed. According to a series of process as above, a result of accumulation-addition in the j-direction for all the pixels in each of similarity images can be obtained.

By the way, a maximum value is calculated, incrementing variables u and v in the flow chart of FIG. 16. As the other calculation method, a maximum value filter image $C'mn_{-1}(u,v)$ to which a maximum value filter is applied for $Cmn_{-1}$ is produced beforehand and thereafter it is multiplied by $\alpha$. The multiply result may be added to $Cmn(u,v)$.

Figure 17:
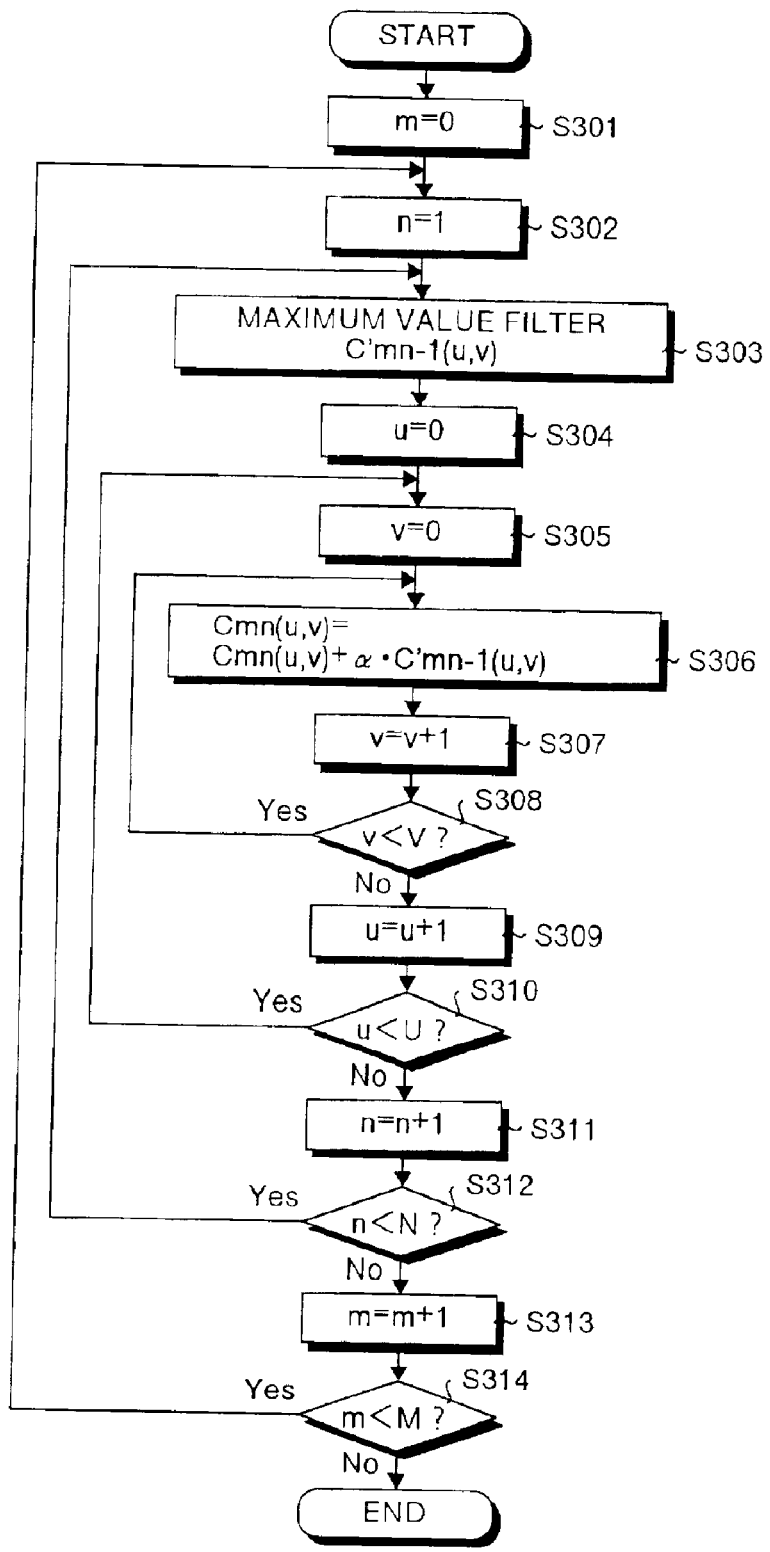
FIG. 17 is a flow chart of an example of the accumulation-addition process when a maximum value filter is used.
Figure 18:
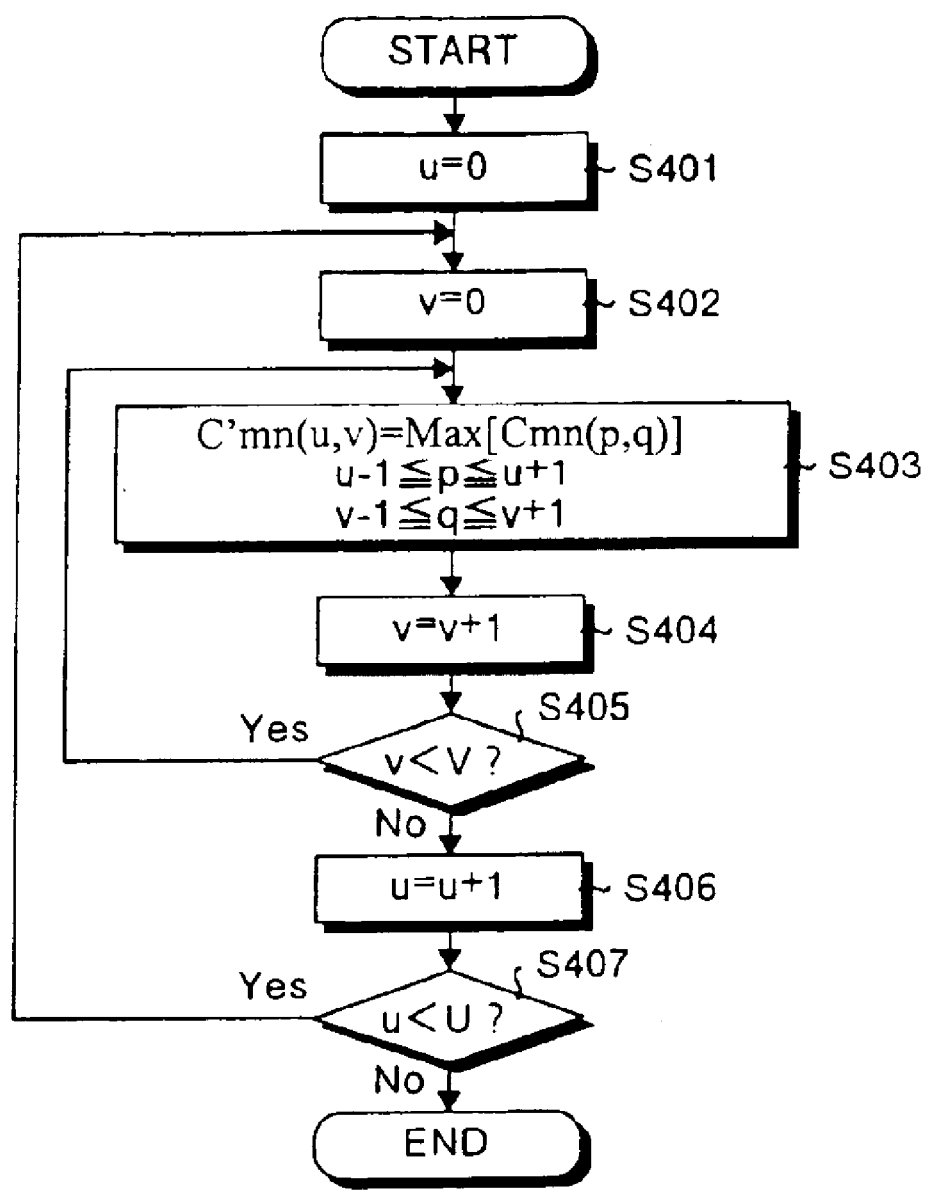
FIG. 18 is a flow chart of process performed by the maximum value filter.

Here, a process procedure when using such a maximum value filter will be hereinafter explained using FIG. 17 and FIG. 18. FIG. 17 shows a flow chart for indicating the j-direction accumulation-addition process procedure using a maximum value filter with the accumulation-addition processing section 14 shown in FIG. 1. FIG. 18 shows a flow chart for indicating a process procedure of the maximum value filter.

As shown in FIG. 17, the variation m is initialized to be "0" (Step 301) and the variation n is initialized to be "1" (Step 302). Thereafter the maximum value filter $C'mn_{-1}(u,v)$ is calculated (Step 303).

Concretely, as shown in FIG. 18, the variations u and v are initialized to be zero (at Steps 401 and 402). Thereafter, the equation $C'mn(u,v)=\text{Max}[Cmn(p,g)]$ is operated (Step 403). Here, the condition of $u-1 \leq p \leq u+1$ and $v-1 \leq q \leq v+1$ is satisfied. The variable v is incremented (Step 404). If the variable v is smaller than V (Yes at Step 405), the procedure is advanced to Step 403 and calculation as above is performed. If the variation v is more than V (No at Step 405), then the variation u is incremented (Step 406). If the variation u is smaller than U (Yes at Step 406), the procedure is advanced to Step 402 and process such as above is repeated, so that a maximum value is obtained.

Thus, if a maximum value filter is defined through the calculation, then the variables u and v are initialized to be "0" (Steps 304 and 305). Thereafter, the following equation will be operated (Step 306):

$$Cmn(u,v)=Cmn(u,v)+\alpha(C'mn_{-1}(u,v))$$

Thereafter, the variation v is incremented (Step 307). If the variation v is smaller than V (Yes at Step 308), then the procedure is advanced to Step 306 and addition process is repeated. Namely, an area to be searched is displaced in the j-direction.

On the other hand, if the variable v is more than V (No at Step 308), then the variable u is incremented (Step 309). If the variable u is smaller than U (Yes at Step 310), the procedure is advanced to Step 305 and the addition process is repeated. Namely, an area to be searched is displaced in the i-direction.

Further, if the variable u is more than U (No at Step 310), then calculation for a pixel is completed and the procedure is advanced to a next pixel. Concretely, the variable n is incremented and the target pixel is moved in the j-direction (Step 311). When comparing this variable n with N (Step 312), if this variable n is smaller than N (Yes at Step 312), then the procedure is advanced to Step 303 and the addition process is repeated.

On the contrary thereto, if the variable n is more than N (No at Step 312), the variable m is incremented and the target pixel is moved in the i-direction (Step 313). Thereafter, if the variable m is smaller than M (Yes at Step 314), then the procedure is advanced to Step 302 and accumulation process is repeated. If the variable m is more than M (No at Step 314), then the process is completed.

Next, an explanation will be given about a process after searching corresponding points. If the corresponding points are searched using the corresponding point searching apparatus 1 shown in FIG. 1, then it will be apparent how the input image is distorted, comparing the input image with the reference image in view of these corresponding points.

Figure 19:
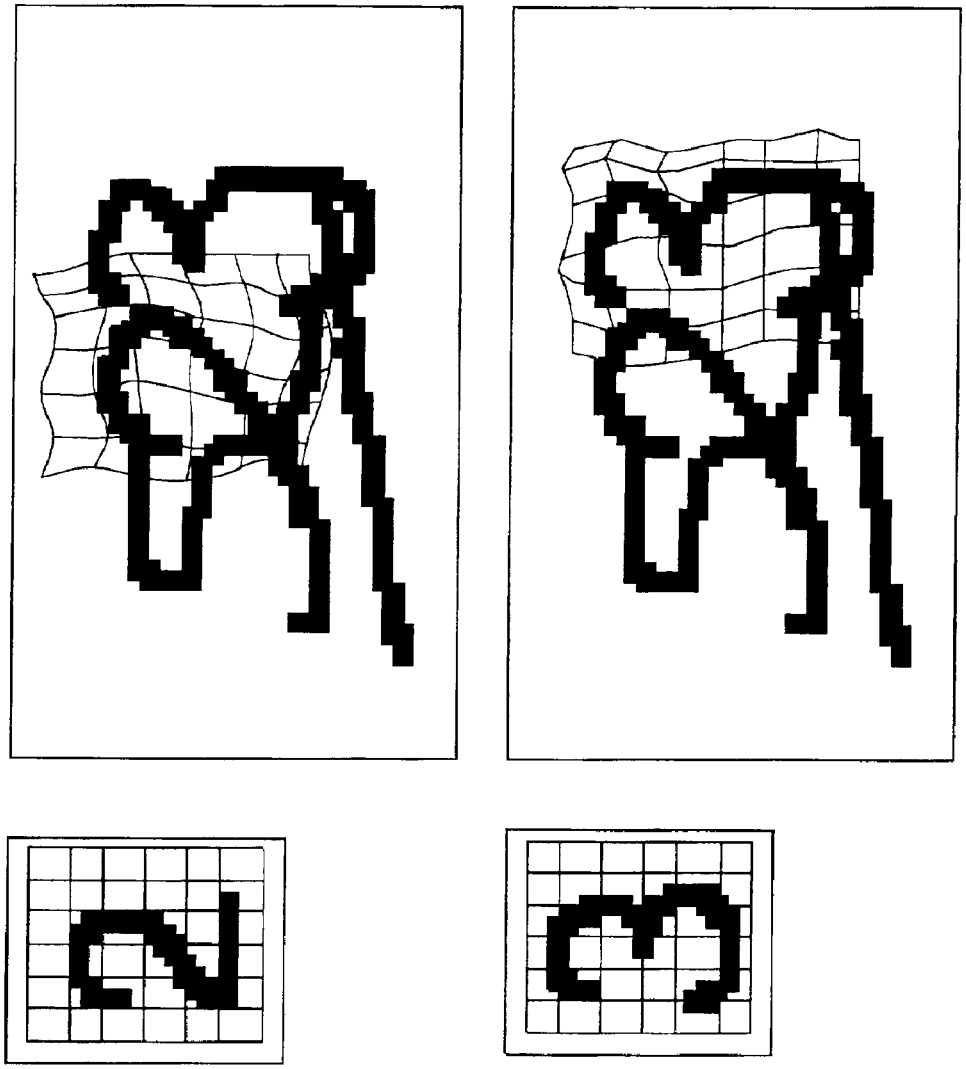
FIG. 19 explains how a character may be cut off from the input image consisting of a many characters.

Concretely, as shown in FIG. 19, when defining an image having a numerical sequence of "523" as an information, as an input image and defining an image having a numeral of "2" as an information, as a reference image, it can be understood that distortion occurs as shown therein. Additionally, when defining an image having a numeral of "3" as an information, as a reference image, it can be understood that distortion occurs as shown therein.

Like this, distortion is used based on such corresponding points. Thereby, each character is separated from a continuously written character sequence, so that an accurate character recognition becomes possible.

This point will be further explained hereinafter. For example, when selecting an image having a numeral of "0" as a reference image, a portion of a closed curve between the numerals of "5" and "2" in the input image is defined as "0", resulting in determining corresponding points, i.e. the distortion. The degree of this distortion is greater than that of the degree when defining an image having a numeral of "2" as a reference image, so that it can be decided that there is no numeral of "0" in the input image.

Further, as shown in FIG. 20, when defining an image having a Chinese character meant by "bird" as an information, as a reference image and an input image, the distortion as shown therein occurs in the input image. Accordingly, the similarity degree is calculated, reforming the distortion, i.e. the deformation, so that an accurate similarity degree can be grasped resulting in that verification of accuracy can be improved.

Figure 21:
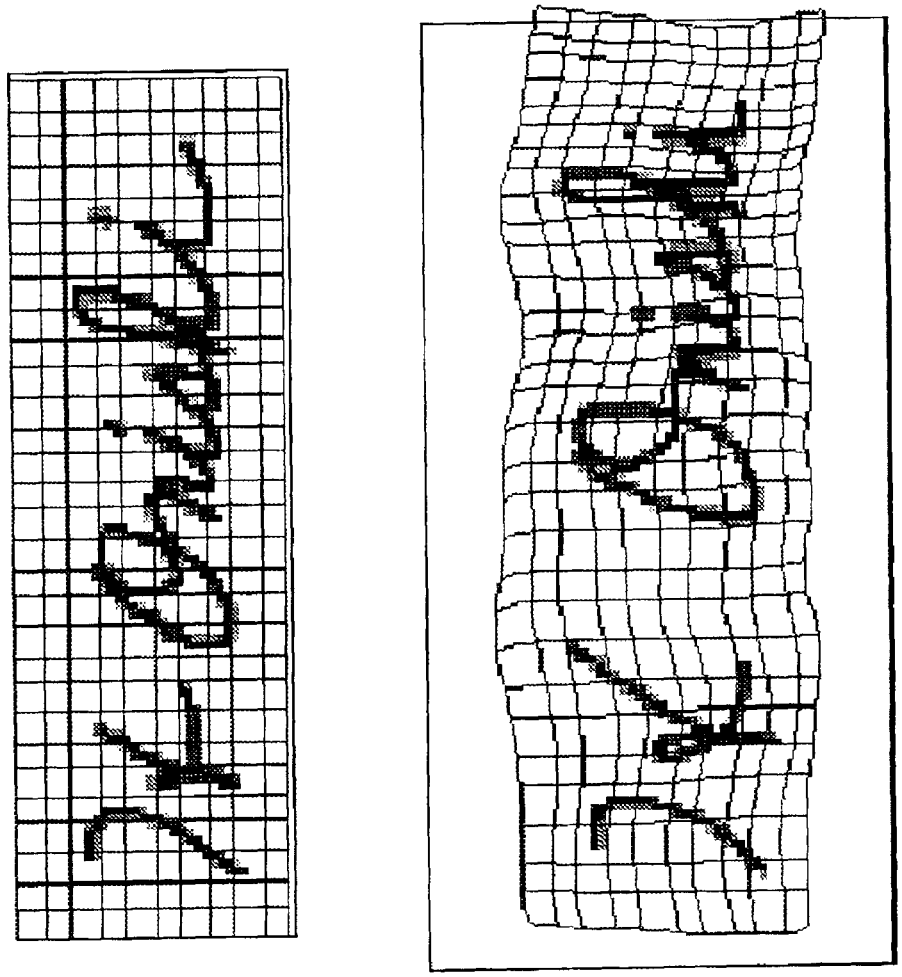
FIG. 21 shows an example in which the present invention is applied to signature authentication.

Furthermore, as shown in FIG. 21, the present invention embodiment can also be applied to signature authentication. It is very difficult to authenticate a signature drawn in English. However, if the degree of the distortion based on corresponding points is obtained using the present invention, then a registration sign and an authentication sign to be authenticated can be accurately authenticated. Here, for the sake of explanation, though drawings will be omitted, the present invention can be applied to detection of an optical flow, 3D-measurement using a stereo image, and an apparatus for examining an external appearance and so on.

As above-mentioned, according to the present embodiment, a reference image and an input image are input from an image input section 10. The division process section 11 produces a reference partial image and an input partial image. The similarity degree image production section 13 respectively produces similarity degree images whose similarity degree between the reference partial image and the input partial image. The accumulation-addition processing section 14 recursively performs an accumulation-addition of a plurality of similarity degrees. Based on the result, the corresponding points determination section 15 determines corresponding points. Thus, (1) a case of resulting in obtaining a local minimum can be reduced because optimization is widely performed, (2) the optimization can be minutely adjusted using a repetition process, and (3) a rapid process can be realized because a parallel distributed process can be performed.

Namely, e.g. in the above embodiment, for the sake of explanation, a case is shown where the size of a reference image is as same as that of an input image. The present invention is not limited by such an embodiment. For example, this invention can also be applied to a case where the size of a reference image is different from that of an input image.

Additionally, in the above embodiment, a case is shown where each of similarity degree images is recursively accumulation-added in the order of j-direction, −j-direction, i-direction, and −i-direction. The present invention is not limited by such an embodiment, too. For example, this invention can also be applied to a case where each of similarity degree images is accumulation-added in an oblique direction or an only single direction. Even a case of in the only single direction, similarity degrees are added, so that a stable information can widely be obtained.

Further additionally, in the above embodiment, a case is shown where a normalized correlation coefficient is used as a similarity degree. The present invention is not limited by such an embodiment.

As explained above, this invention provides an apparatus capable of rapidly processing with a repetition process by each of blocks.

Furthermore, this invention provides an apparatus capable of performing a process considering over a distortion (deformation) of an input image.

Furthermore, this invention provides an apparatus capable of obtaining a similarity degree image being robust for variance of contrast of an image.

Furthermore, this invention provides an apparatus capable of widely using an information and reducing a case resulting in obtaining a local minimum.

Furthermore, this invention provides an apparatus capable of performing a process in which information is used more widely.

Furthermore, this invention provides an apparatus capable performing an optimized minute adjustment by a repetition process.

Furthermore, this invention provides an apparatus capable of easily specifying corresponding points.

Furthermore, this invention provides an apparatus capable of saving useless accumulation-addition and efficiently correcting a deformation.

Furthermore, when applying correspondence relationship to between images, this invention provides a method capable of rapidly obtaining a result of the correspondence application between images without resulting in obtaining any local solution when applying a correspondence between image.

Furthermore, this invention provides a method capable of rapidly processing with a repetition process by each of blocks.

Furthermore, this invention provides a method capable of performing a process considering over a distortion (deformation) of an input image.

Furthermore, this invention provides a method capable of obtaining a similarity degree image being robust for variance of contrast of an image.

Furthermore, this invention provides a method capable of widely using an information and reducing a case resulting in obtaining a local minimum.

Furthermore, this invention provides a method capable of performing a process in which more widely information is used.

Furthermore, this invention provides a method capable of performing an optimized minute adjustment by a repetition process.

Furthermore, this invention provides a method capable of easily specifying corresponding points.

Furthermore, this invention provides a method capable of saving useless accumulation-addition and efficiently correcting a deformation.

Furthermore, this invention provides a computer program capable of realizing the method according to the present invention on a computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for searching corresponding points between an input image and a reference image which is an object of comparison with the input image, said apparatus comprising:

a similarity degree image production unit which produces a plurality of similarity degree images each having a plurality of similarity degrees between the input image and the reference image as a plurality of pixel values; and a corresponding point detection unit which detects corresponding points between the input image and the reference image based on the similarity degree images produced by said similarity degree image production unit, wherein said similarity degree image production unit includes:

a reference partial image production unit which divides the reference image into a plurality of blocks as a plurality of reference partial images;

an input partial image production unit which divides the input image into a plurality of blocks as a plurality of input partial images; and a similarity degree calculation unit which calculates the similarity degrees between the input partial images and the reference partial images, wherein the similarity degree images include a first similarity degree image and a second similarity degree image, and wherein said corresponding point detection unit includes:

an accumulation-addition unit which sequentially accumulation-adds a first pixel value of a first pixel selected from a group of pixels including one pixel and a plurality of pixels around the one pixel in the first similarity degree image, to a second pixel value of a second pixel in the second similarity degree image, the one pixel having a coordinate in a block defined by each of the similarity degree images, the coordinate corresponding to that of the second pixel; and a corresponding point specific unit which specifies the corresponding points based on the similarity degree images which have been accumulatively added by said accumulation-addition unit, wherein said accumulation-addition unit adds a pixel value of a pixel having a maximum pixel value from among the group of pixels, as the first pixel value.

2. The apparatus according to claim 1, wherein said input partial image production unit produces the plurality of input partial images each of whose size is greater than a size of each of the reference partial images and each of which is obtained by dividing said input image into the plurality of blocks whose parts are mutually overlapped.

3. The apparatus according to claim 1, wherein said similarity degree calculation unit calculates a Euclid distance or a normalized correlation coefficient between the input partial images and the reference partial images as the similarity degrees.

4. The apparatus according to claim 1, wherein said accumulation-addition unit recursively repeats accumulation-addition for the plurality of similarity degree images in a horizontal direction, a direction opposite to the horizontal direction, a vertical direction, and a direction opposite to the vertical direction.

5. The apparatus according to claim 1, wherein said accumulation-addition unit recursively repeats accumulation-addition for the plurality of similarity degree images in a horizontal direction, a direction opposite to the horizontal direction, a vertical direction, and a direction opposite to the vertical direction until a width of variance of position of a maximum value in each of the similarity degree images becomes smaller than a predetermined value.

6. The apparatus according to claim 1, wherein said corresponding point specific unit specifies a pixel position of a pixel having a maximum pixel value in each of the similarity degree images which have been accumulatively added by said accumulation-addition unit, as each corresponding point.

7. The apparatus according to claim 1, wherein the accumulation-addition unit sequentially executes the accumulation addition for all the similarity degree images in at least one direction.

8. The apparatus according to claim 1, wherein the accumulation-addition unit is configured to calculate a maximum value filter including a plurality of maximum pixel values each being a maximum of pixel values of a group of pixels in the similarity degree images, and to add one of the maximum pixel values from the maximum value filter as the first pixel value to the second pixel value.

9. A method of searching corresponding points between an input image and a reference image which is an object of comparison with the input image, the method comprising:

producing a plurality of similarity degree images each having a plurality of similarity degrees between the input image and the reference image as a plurality of pixel values; and detecting corresponding points between the input image and the reference image based on the plurality of similarity degree images produced, wherein the producing includes, dividing the reference image into a plurality of blocks as a plurality of reference partial images;

dividing the input image into a plurality of blocks as a plurality of input partial images; and calculating the similarity degree between the input partial images and the reference partial images, wherein the plurality of similarity degree images include a first similarity degree image and a second similarity degree image, and wherein the detecting includes:

sequentially accumulation-adding a first pixel value of a first pixel selected from a group of pixels including one pixel and a plurality of pixels around the one pixel in the first similarity degree image, to a second pixel value of a second pixel in the second similarity degree image, the one pixel having a coordinate in a block defined by each of the similarity degree images, the coordinate corresponding to that of the second pixel; and specifying the corresponding points based on the similarity degree images which have been accumulatively added, wherein the accumulation-adding includes adding a pixel value of a pixel having a maximum pixel value from the group of pixels, as the first pixel value.

10. The method according to claim 9, wherein the producing includes generating the plurality of input partial images each of whose size is greater than a size of each of the reference partial images and each of which is obtained by dividing said input image into the plurality of blocks whose parts are mutually overlapped.

11. The method according to claim 9, wherein the calculating includes calculating a Euclid distance or a normalized correlation coefficient between the input partial images and the reference partial images as the similarity degrees.

12. The method according to claim 9, wherein the accumulation addition is recursively repeated for the plurality of similarity degree images in a horizontal direction, a direction opposite to the horizontal direction, a vertical direction, and a direction opposite to the vertical direction.

13. The method according to claim 9, wherein the accumulation addition is recursively repeated for the plurality of similarity degree images in a horizontal direction, a direction opposite to the horizontal direction, a vertical direction, and a direction opposite to the vertical direction until a width of variance of position of a maximum value in each of similarity degree images becomes smaller than a predetermined value.

14. The method according to claim 9, wherein the specifying includes specifying a pixel position of a pixel having a maximum pixel value in each of the similarity degree images which have been accumulatively added, as each corresponding point.

15. The method according to claim 9, wherein the accumulation addition includes sequentially executing the accumulation addition for all the similarity degree images in at least one direction.

16. The method according to claim 9, wherein the accumulation addition includes:
calculating a maximum value filter including a plurality of maximum pixel values each being a maximum of pixel values of a group of pixels in the similarity degree images; and
adding one of the maximum pixel values from the maximum value filter as the first pixel value to the second pixel value.

17. A computer program embodied in a computer readable medium for performing a method of searching corresponding points between an input image and a reference image which is an object of comparison with the input image, the method comprising:
producing a plurality of similarity degree images each having a plurality of similarity degrees between the input image and the reference image as a plurality of pixel values; and
detecting corresponding points between the input image and the reference image based on the plurality of similarity degree images produced,
wherein the producing includes,
dividing the reference image into a plurality of blocks as a plurality of reference partial images;
dividing the input image into a plurality of blocks as a plurality of input partial images; and
calculating the similarity degree between the input partial images and the reference partial images, wherein the plurality of similarity degree images include a first similarity degree image and a second similarity degree image, and
wherein the detecting includes:
sequentially accumulation-adding a first pixel value of a first pixel selected from a group of pixels including one pixel and a plurality of pixels around the one pixel in the first similarity degree image, to a second pixel value of a second pixel in the second similarity degree image, the one pixel having a coordinate in a block defined by each of the similarity degree images, the coordinate corresponding to that of the second pixel; and
specifying the corresponding points based on the similarity degree images which have been accumulatively added,
wherein the accumulation-adding includes adding a pixel value of a pixel having a maximum pixel value from the group of pixels, as the first pixel value.

18. The computer program according to claim 17, wherein the producing includes generating the plurality of input partial images each of whose size is greater than a size of each of the reference partial images and each of which is obtained by dividing said input image into the plurality of blocks whose parts are mutually overlapped.

19. The computer program according to claim 17, wherein the calculating includes calculating a Euclid distance or a normalized correlation coefficient between the input partial images and the reference partial images as the similarity degrees.

20. The computer program according to claim 17, wherein the accumulation addition is recursively repeated for the plurality of similarity degree images in a horizontal direction, a direction opposite to the horizontal direction, a vertical direction, and a direction opposite to the vertical direction.

21. The computer program according to claim 17, wherein the accumulation addition is recursively repeated for the plurality of similarity degree images in a horizontal direction, a direction opposite to the horizontal direction, a vertical direction, and a direction opposite to the vertical direction until a width of variance of position of a maximum value in each of similarity degree images becomes smaller than a predetermine value.

22. The computer program according to claim 17, wherein the specifying includes specifying a pixel position of a pixel having a maximum pixel value in each of the similarity degree images which have been accumulatively added, as each corresponding point.

23. The computer program according to claim 17, wherein the accumulation addition includes sequentially executing the accumulation addition for all the similarity degree images in at least one direction.

24. The computer program according to claim 17, wherein the accumulation addition includes:
calculating a maximum value filter including a plurality of maximum pixel values each being a maximum of pixel values of a group of pixels in the similarity degree images; and
adding one of the maximum pixel values from the maximum value filter as the first pixel value to the second pixel value.

* * * * *